United States Patent [19]

Hamahata et al.

[11] Patent Number: 5,742,448
[45] Date of Patent: Apr. 21, 1998

[54] DEVICE USING CAM-BASED MOVEMENTS TO LOAD AND UNLOAD A TAPE CASSETTE

[75] Inventors: Hiroshi Hamahata; Seiji Mori, both of Osaka, Japan

[73] Assignee: Funai Electric Co., Ltd., Osaka, Japan

[21] Appl. No.: 691,721

[22] Filed: Aug. 5, 1996

Related U.S. Application Data

[63] Continuation of Ser. No. 541,542, Oct. 10, 1995, abandoned, which is a continuation of Ser. No. 243,338, May 16, 1994, abandoned, which is a continuation of Ser. No. 853,630, Mar. 19, 1992, abandoned.

[30] Foreign Application Priority Data

Dec. 11, 1991 [JP] Japan ................................ 3-109853
Dec. 11, 1991 [JP] Japan ................................ 3-351585

[51] Int. Cl.[6] ........................................ G11B 15/675
[52] U.S. Cl. ........................................ 360/96.5; 360/93
[58] Field of Search ........................ 360/96.5, 85, 95, 360/93, 99.06, 99.02

[56] References Cited

U.S. PATENT DOCUMENTS 4,723,236  2/1988  Kitami .................................. 360/93
4,979,061  12/1990 Kishimoto et al. ................... 360/96.5
5,050,022  9/1991  Aizawa ................................ 360/96.5
5,262,910  11/1993 Hashiguchi et al. ................. 360/96.5

FOREIGN PATENT DOCUMENTS 56-130852  10/1981  Japan ................................ 360/96.5
61-289572  12/1986  Japan ................................ 360/96.5

*Primary Examiner*—Stuart S. Levy
*Assistant Examiner*—Kevin M. Watkins
*Attorney, Agent, or Firm*—Evenson, McKeown, Edwards & Lenahan, PLLC

[57] ABSTRACT

A device for loading and unloading a tape cassette includes a cam disc rotatably supported to a chassis and at least one guide route disposed thereon and extending from near the rotating axis of the cam disc to the periphery thereof so as to be topologically shifted in the rotating direction, and a swinging arm pivoted to the chassis and having a cam follow pin received in the guide route. The tape cassette is transported together with the cassette holder from an inlet port to the tape deck and vice versa. A shift member is adapted to retractively guide the cassette holder by cooperating with the swinging arm.

5 Claims, 10 Drawing Sheets

DEVICE USING CAM-BASED MOVEMENTS TO LOAD AND UNLOAD A TAPE CASSETTE

This application is a continuation of application Ser. No. 08/541,542, filed Oct. 10, 1995 abandoned, which is a continuation of application Ser. No. 08/243,338, filed May 16, 1994, abandoned, which is a continuation of application Ser. No. 07/853,630, filed Mar. 19, 1992, abandoned.

BACKGROUND OF THE INVENTION

The present invention relates to a device for loading/unloading a tape cassette into or from a tape deck adapted to a tape recording and/or playing device such as a video tape recorder, a video tape playera, DAT and camera recorder for home or business use as well as a combination recorder for use with a television, and other visual or audio devices having a tape recorder and/or player.

Prior recorders and/or players with tape-winding systems each generally included a tape deck on which a tape cassette is removably set, a torque transmission means through which either one of tape reels contained in the tape cassette on the tape deck is alternately rotated in a forward or backward direction by means of a drive motor, and means for loading/unloading a tape cassette from an inlet port to the tape deck and vice versa.

In order to avoid a shocking motion of the tape cassette from being applied to a tape deck at the final stage, at which the tape cassette is set on the tape deck, a tape recording and/or regenerating device such as that mentioned above had been provided with a complicated and bulky construction used in a condition in which the tape cassette is fast-set.

OBJECTS OF THE INVENTION

An object of this invention is to provide a device for loading/unloading a tape cassette to or from a tape deck which is improved so as to decrease the shocking motion of the tape cassette with its simple and compact cam assembly under fast setting of the tape cassette.

A second object of this invention is to provides a device for loading/unloading a tape cassette which is improved or from a tape deck, so as to maintain a satisfactory stroke with a simple and compact cam assembly applied to tape cassette transportation, by which the tape cassette is smoothly carried from an inlet port to the tape deck.

A third object of this invention is to provide a device for loading/unloading a tape cassette to or from a tape deck which is improved so as to set the tape cassette to the tape deck in a secured condition after its transportation.

SUMMARY OF THE INVENTION

According to the present invention, there is provided a device for loading/unloading a tape cassette used in a tape recorder and/or player which includes a cassette holder adapted to hold the tape cassette as it is charged through an inlet port, a tape deck in which the tape cassette is removably set together with the cassette holder, and a torque transmission means through which either one of tape reels contained in the tape cassette on the tape deck is alternately rotated in a forward or backward direction by means of a drive motor. The loading/unloading device includes a cam disc rotatably supported to a chassis and at least one guide route disposed thereon extending from the near side of the rotating axis thereof to the periphery thereof in a manner so as to be topologically shifted in the rotating direction. A swinging arm is pivoted to the chassis and has a cam follow pin belonging to the guide route, and means are provided for transporting the tape cassette together with the cassette holder from the inlet port to the tape deck and vice versa. The transporting means includes a shift member, adapted to retractively guide the cassette holder, cooperating with the swinging arm.

Further features and advantages of the present invention will be apparent from the following description made with reference to the accompanying drawings.

DETAILED DESCRIPTION OF THE PREFERRED EMBODIMENTS

Figure 1:
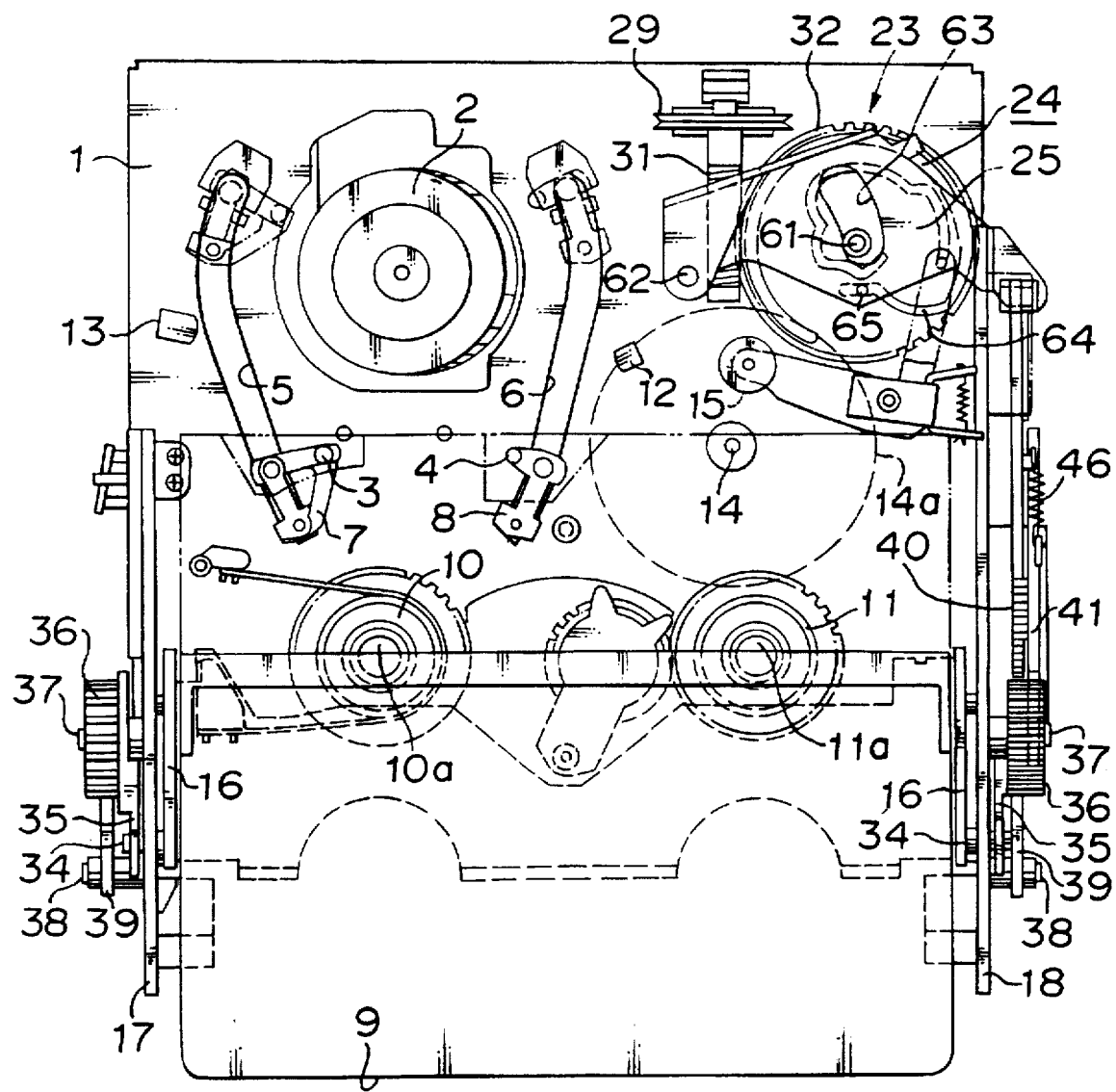
FIG. 1 is a plan view of a tape recording and playing device including means for loading/unloading a tape cassette according to an embodiment of this invention wherein a tape cassette is not yet set on a tape deck disposed in a chassis.

A device according to this invention is provided for loading/unloading a tape cassette adapted to a tape recorder and/or player as well as a combination thereof which is illustrated in the drawings and described hereinafter.

The tape recording and/or playing device in one embodiment includes a tape deck chassis 1 having a pair of tape-reel setting discs 10 and 11 with rotating shafts 10a and 11a to which a pair of tape reels journalled in a tape cassette 9 are removably engaged as the tape cassette 9 is set on the deck, and a torque transmission device for alternately supplying torque power from a drive motor (not shown) to either one of the tape discs 10 and 11. The drive motor includes a fly wheel 14a and an output shaft with a capstan roller 14.

The device further includes a cassette holder 16 for guiding the tape cassette 9 along side guide members 17 and 18 to the tape reel setting discs 10 and 11, a pinch roller 15 adapted to pinch the tape to the capstan roller 14, a head cylinder 2 near which are disposed an input and output head 12 applied to audio-signal and an erasing head 13, a pair of slide members 7 and 8 with tape-loading pins 3 and 4 adapted to guide the tape to the periphery of the head cylinder 2 when the cassette 9 together with the cassette holder 16 is loaded on the tape-reel setting discs, a pair of guide rails 5 and 6 disposed on the chassis 1, and means for carrying the slide members 7 and 8 along the guide rails.

Figure 2:
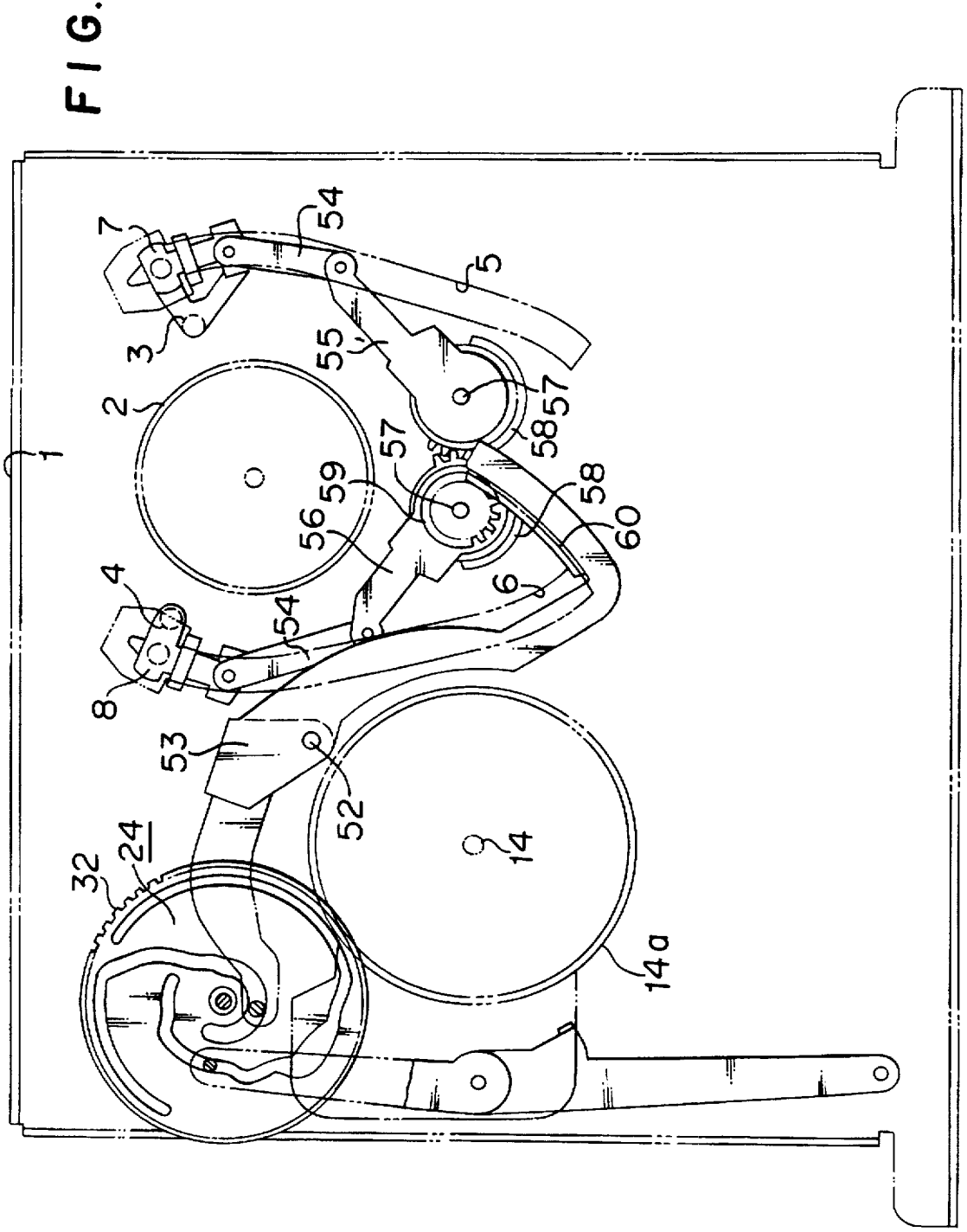
FIG. 2 is a bottom view of the embodiment mentioned above wherein the tape cassette is set on the tape deck.
Figure 3:
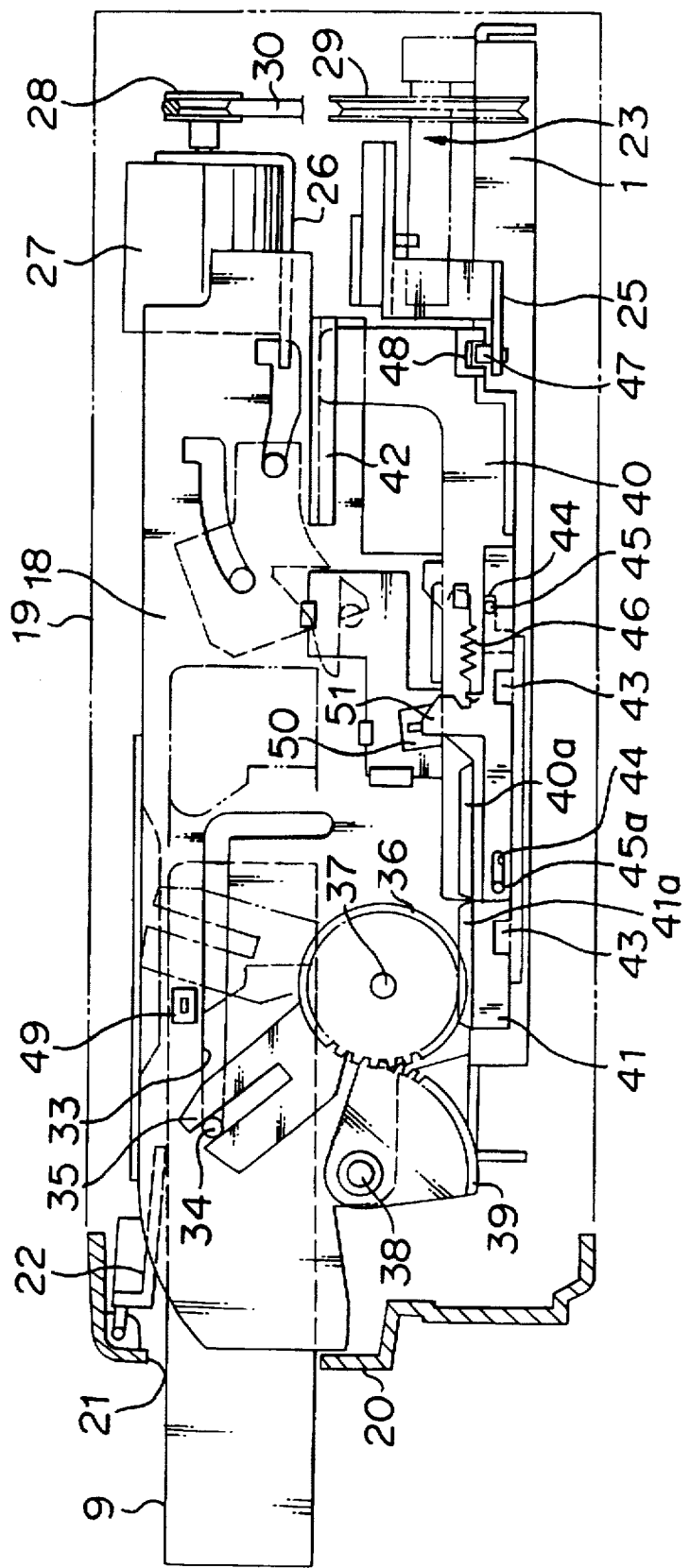
FIG. 3 is a side view of the essential part of the embodiment mentioned above wherein the tape cassette is not yet set on the tape deck.

The carrying means includes two link members 54 pivoted to the slide members 7 and 8, respectively, two loading arms 55 and 56 pivoted to the link members 54 respectively and rotatably supported to the back side of the chassis 1 by means of pivots 57, two gears 58 fixed to the loading arms 55 and 56, respectively, and intermeshed with each other, a pinion 59 coaxially secured to the left side of one of the gears 58, and a loading lever 53 swingingly supported to the back side of the chassis 1 by means of a pivot pin 52 and having rack teeth 60 intermeshed with the pinion 59 so that the loading lever 53 is carried by means of a cam system (mentioned hereinafter) when the tape cassette 9 is loaded to the tape reel discs, as shown in FIG. 2 in detail.

In order to carry the cassette holder 16 with the tape-cassette 9 from an input and output portion of the chassis 1 to the tape reel setting discs or vice versa, there is provided a device 23 for loading/unloading the tape cassette 9 together with the cassette holder 16, which includes a cam disc 24 rotatably supported to a chassis 1 by means of a cam shaft 61 and at least one guide route 64 disposed thereon with it extending from the near side of the rotating axis thereof to the periphery thereof in a manner to be topologically shifted in the rotating direction, a swinging arm 25 pivoted to the chassis 1 by means of a pivot pin 62 and having a cam follow pin 65 received in the guide route 64, and means for transporting the tape cassette 9 together with the cassette holder 16 from the inlet port 21 to the tape deck and vice versa.

The loading/unloading device further includes a shift member 40 retractively supported by means of upper and lower guide rails 42 and 43 at the one side of the chassis 1 with its rear end having a notch 48 engaged to a coupling roller 47, which is pivoted to the swinging arm 25, the shift member 40 having a rack gear 40a integrally formed to the front portion thereof, a guide slit 44 and a guide pin 45, a sub-shift member 41 retractively supported by the same means of the guide rails 42 together with the shift member 40 and biased to a rear side by means of a tension spring member 46 bridged between both shift members 40 and 41, the sub-shift member 41 having a rack gear 41a integrally formed to the front portion thereof in a manner to be contiguously aligned to the rack gear 40a, the guiding slit 44 slidably guide the guide pin 45 and a guide pin 45a being slidably inserted in a guide slit 44a, a pair of gears 36 pivotally supported to both side guide members 17 and 18 by means of pivot axis 37 and having fork-shaped guide arms 35, respectively, the right side gear 36 only being alternately intermeshed with the rack gear 40a and 41a, a pair of sector gears 39, pivoted to the side guide members 17 and 18, connected by means of a common pivot shaft 38 journalled to the side guide members 17 and 18, the gears 39 being intermeshed with the gears 36, respectively, and a pair of guide pins 34 attached to both sides of the cassette holder 16 and penetrating through L-shaped guide slits 33 formed in the side guide members 17 and 18 in a manner to be guided along the guide slits 33 by the fork-shaped guide arms 35.

In order to transmit torque power from the cam-drive motor 27, on bracket 26 to the cam disc 24, the device of this invention includes a reversible worm gear 31 intermeshed with a gear 32 formed on the periphery of the cam disc 24, the worm gear 31 having a shaft which is journalled to bearings disposed to the chassis 1 and coaxially connected to a driven pulley 29 rotatably supported to the shaft. The driven pulley 29 is rotated through a drive pulley 28 connected to the output shaft of the cam-drive motor 27 and an endless belt 30 stretched between the pulleys 28 and 29 in the wound condition.

In this embodiment, the loading/unloading device is provided with a control switching system having a micro-switch means 49 for starting the drive operation of the cam-drive motor 27 thereby load the tape cassette 9 to the tape deck, and a micro-switch means 50 actuated by actuating element 51 on sub-shift member 41 for stopping the drive operation of the cam-drive motor 27.

Figure 6:
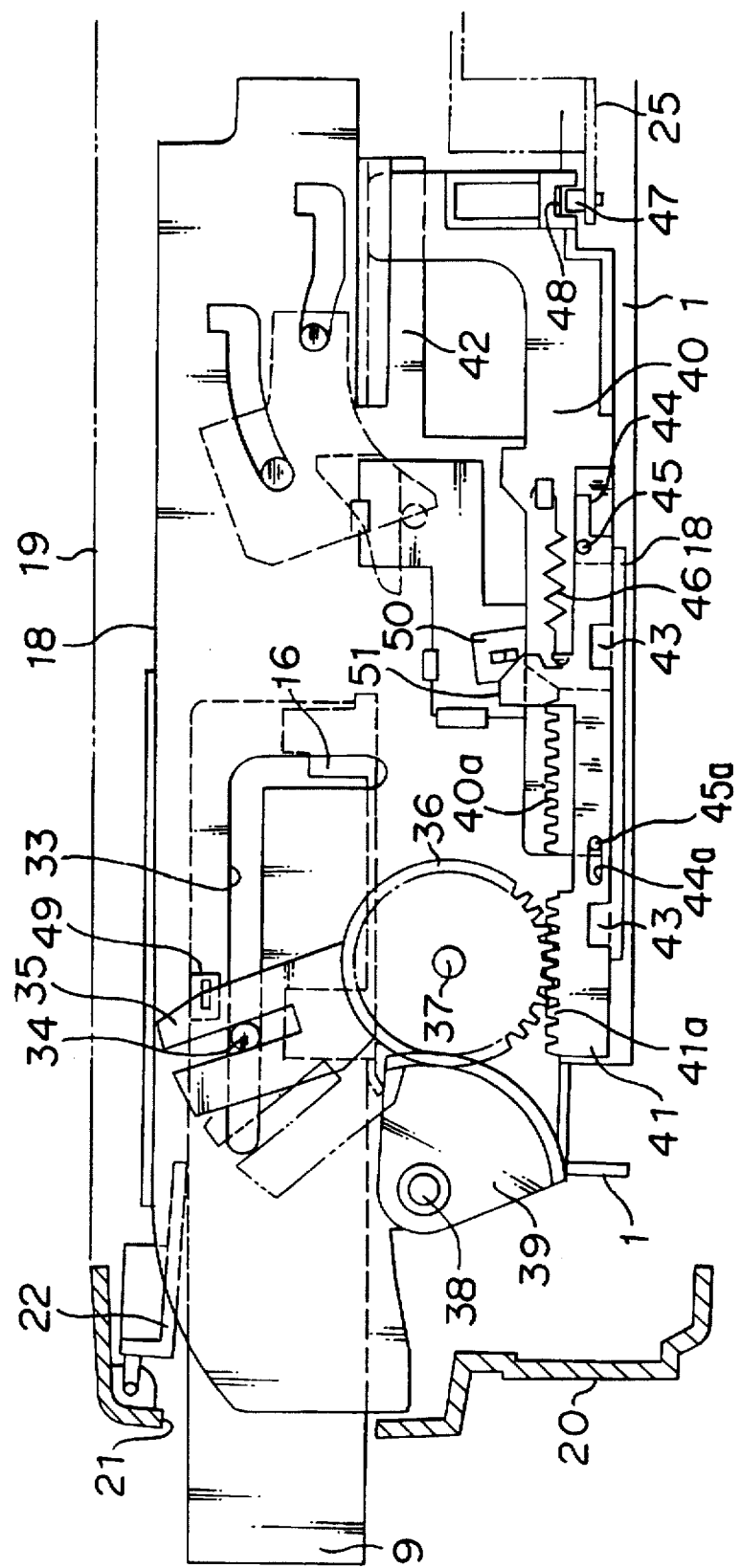
FIG. 6 is a side view of the essential part of the embodiment mentioned above wherein the tape cassette is carried on a transporting way.

Accordingly, when the tape cassette is inserted to the cassette holder 16 through the inlet port 21, thereby pivoting cover 22, and further pushed together with the cassette holder 16 in order to be loaded to the tape deck, the guide pins 34 are carried to the backside along the guide slits 33 so as to rotate the gears 36 with their guide pins 34 pushing the fork-shaped arms 35 and the opposite portion of one of the arms 35 switches on the micro-switch means 49. In this case, the sub-shift member 41 is shifted forwards against the bias of the tension spring member 46, as shown in FIG. 6. As resultant operation, the cam-drive motor 27 is energized in a general direction, so that the cam disc 24 is rotated in a clockwise direction, thereby guiding the cam follow pin 65 along the guide route 64 and then to turn the swinging arm 25 in a prescribed variable angular acceleration.

At this stage, the shift member 40 overtakes the sub-shift member 41 and pushes them with its rack gear 40a joining to the rack gear 41a in the continual aligned condition, thereby carrying the tape cassette 9 to the tape deck together with the cassette holder 16 and then setting the tape reels to the tape reel setting discs 10 and 11.

Figure 4:
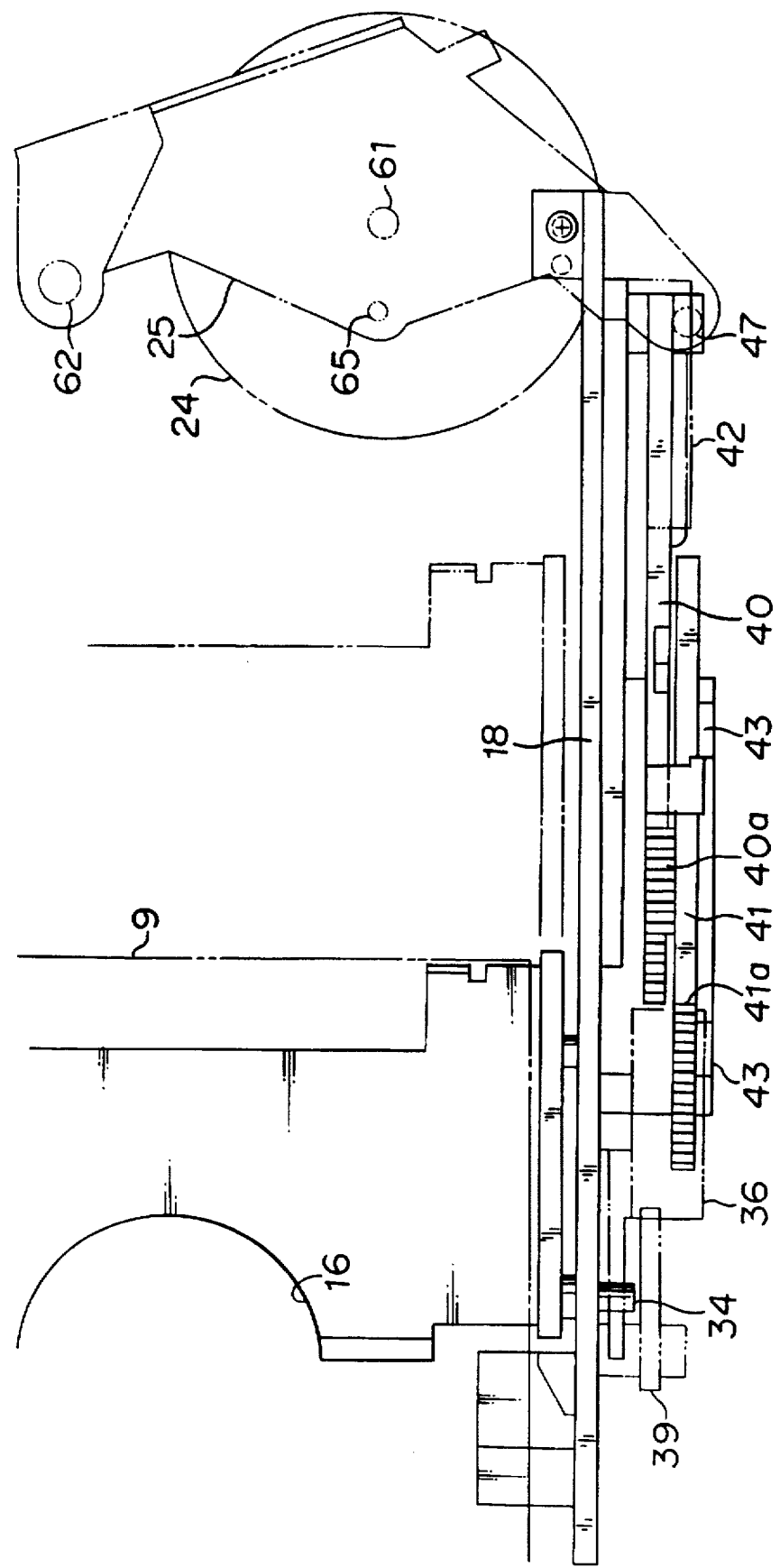
FIG. 4 is an enlarged plan view of the essential part of the embodiment mentioned above wherein the tape cassette is not yet set on the tape deck.
Figure 5:
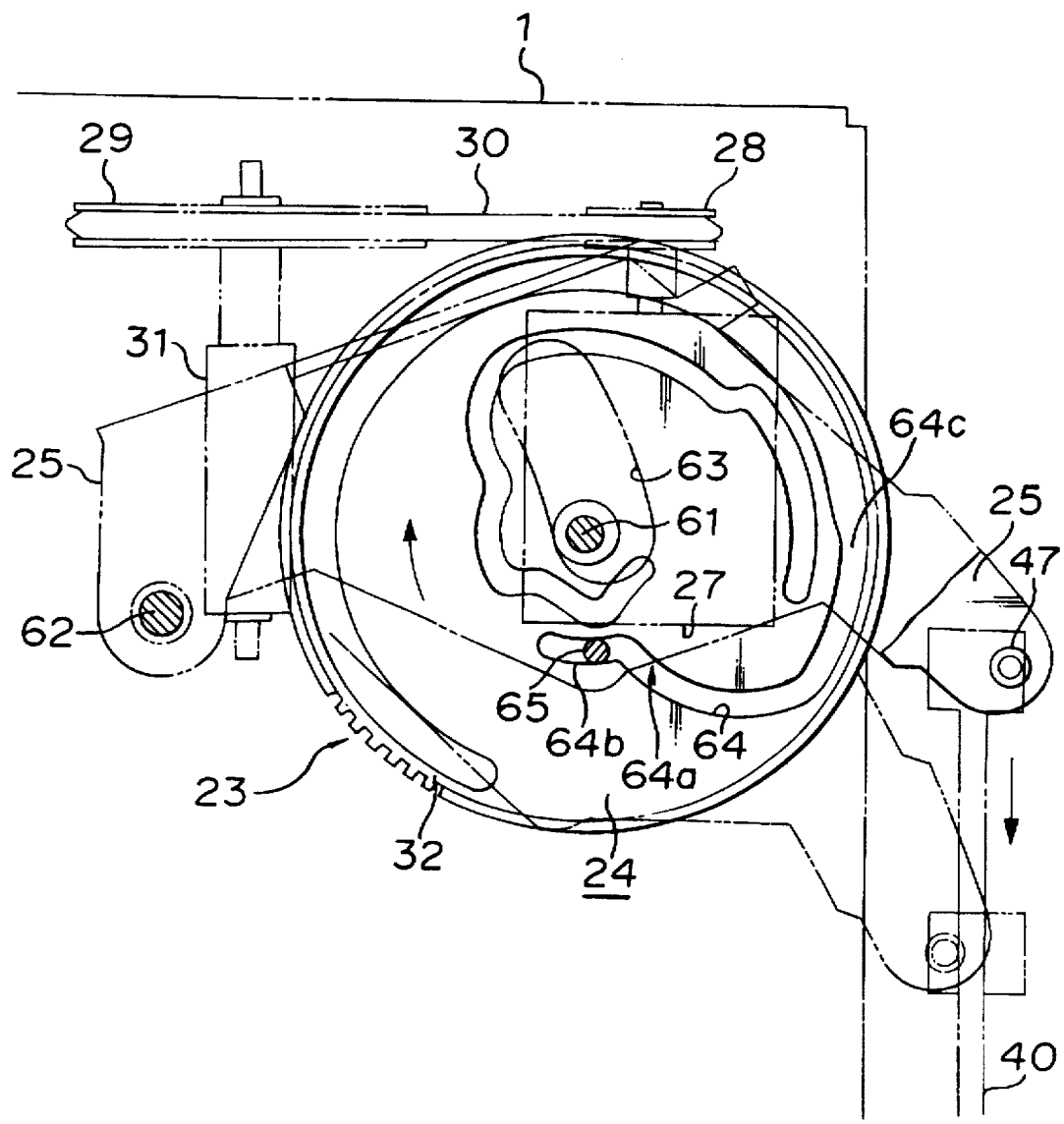
FIG. 5 is an enlarged plan view of the essential part of the embodiment mentioned above wherein a cam disc is illustrated in detail.
Figure 7:
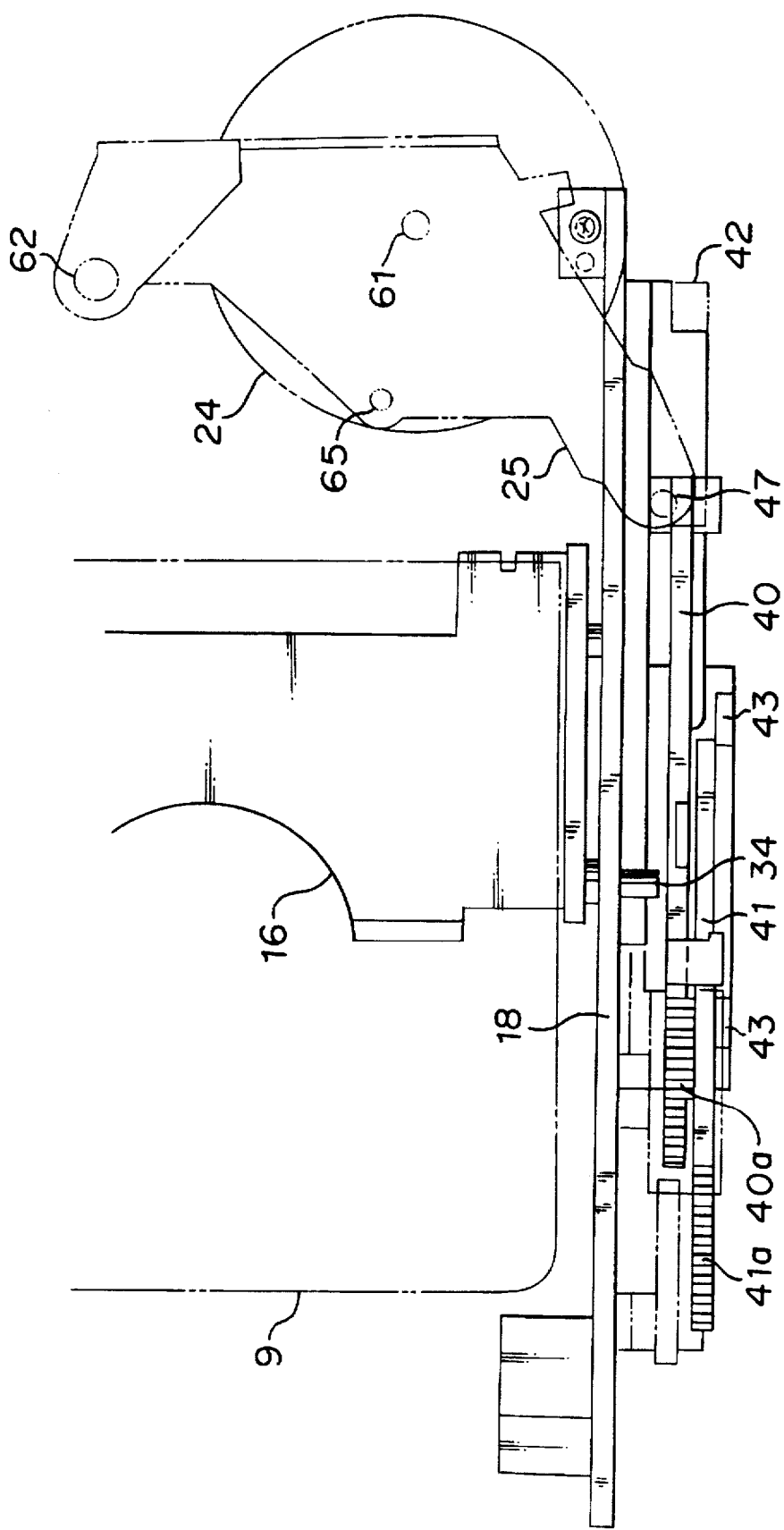
FIG. 7 is an enlarged plan view of the essential part of the embodiment mentioned above wherein the tape cassette is set on the tape deck.

While the cam disc 24 is rotated from a starting position as shown in FIG. 4 to a finishing position as shown in FIG. 7, the cam follow pin 65 is guided along the guide route 64 in such a manner that the swinging arm 25 is quickly turned when the cam follow pin 65 is carried at the first interval portion 64a adjacent to the starting portion 64b, and the swinging arm 25 is slowly turned and settled in a constant position when the cam follow pin 65 is carried at the second interval portion 64c continuously defined next to the first interval portion 64a. Accordingly, the tape cassette 9 is quickly carried toward the tape deck at the first stage, and slowly carried toward the tape deck at the final stage so as to avoid a shock to the tape cassette 9 when it abuts the tape reel setting discs at its setting position.

When the tape cassette is unloaded from the tape deck, the cam-drive motor 27 is energized in a reverse direction, so that the cam disc 24 is rotated in a counterclockwise direction, thereby returning the swinging arm 25 and then shifting the shift member 40 backwards. Accordingly, the tape cassette 9 together with the cassette holder 16 is carried to the output position defined by the inlet port 21.

In this embodiment, the swinging arm 25 includes a penetrated slit 63 through which the cam shaft 61 is disposed in a manner to be obstructed by the swinging arm 25. The cam disc 24 further includes some guide routes formed to the upper and lower surfaces thereof so as to guide some guide pins adapted to suitable means for recording and/or regenerating operations of this device associated with the motion of the cam disc 24.

Figure 8:
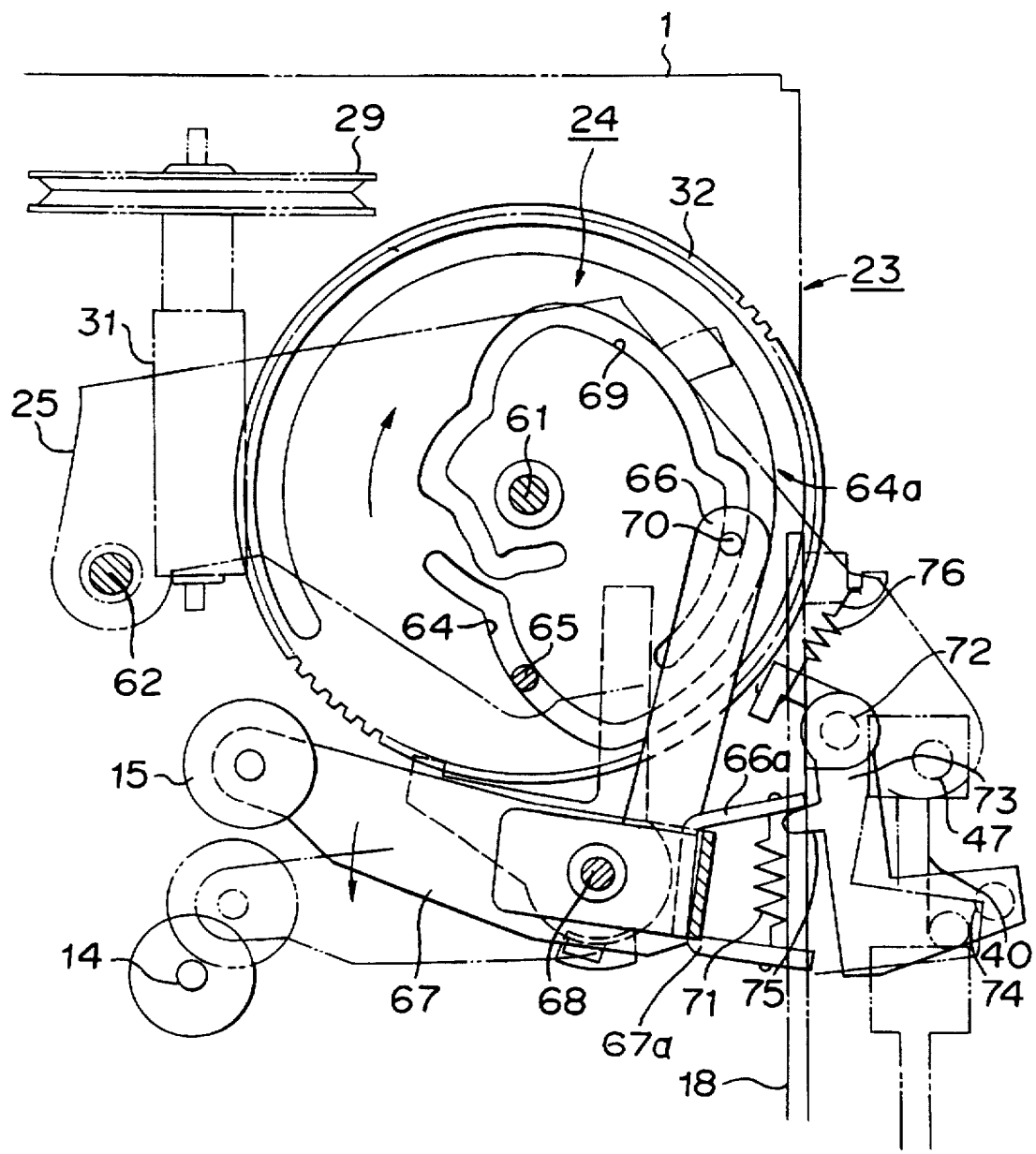
FIG. 8 is an enlarged plan view of the essential part of another embodiment of this invention which is a modification of the first embodiment.

In order to maintain the tape cassette 9 at its loading position defined relative to the tape deck after its loading operation mentioned above, another embodiment as shown in FIG. 8 includes means for locking the shift member 40 to the loading position. The locking means is assembled in a suitable means for shifting the pinch roller 15, which has a supporting arm 67 pivoted to the chassis 1 by means of a pivot shaft 68, a guide arm 66 pivoted by the same pivot 68 and having a guide pin 70 which is guided along a guide route 69 provided on the cam disc 24 separate from the guide route 64. A tension spring member 71 is stretched between spring holders 66a and 67a formed on the arms 66 and 67, respectively, so as to bias the arm 67 toward the pinching position of the pinch roller 15 relative to the capstan roller 14.

The locking means includes a stopper lever 73 pivoted to a bracket mounted on the side wall of the chassis by means of a pivot pin 72, a lock pin 74 with a hook 75 attached to the free end portion of the stopper lever 73 and adapted to lock the shift member 40 against the unloading direction when the hook 75 is engaged with the supporting arm 67 at the relieving position of the pinch roller 15, at which the stopper lever 73 is kept in the locking position against the bias of a tension spring member 76 stretchingly bridged between the hook portions, one of which is formed on the stopper lever 73 and the other of which is mounted on the side wall of the chassis.

Figure 9:
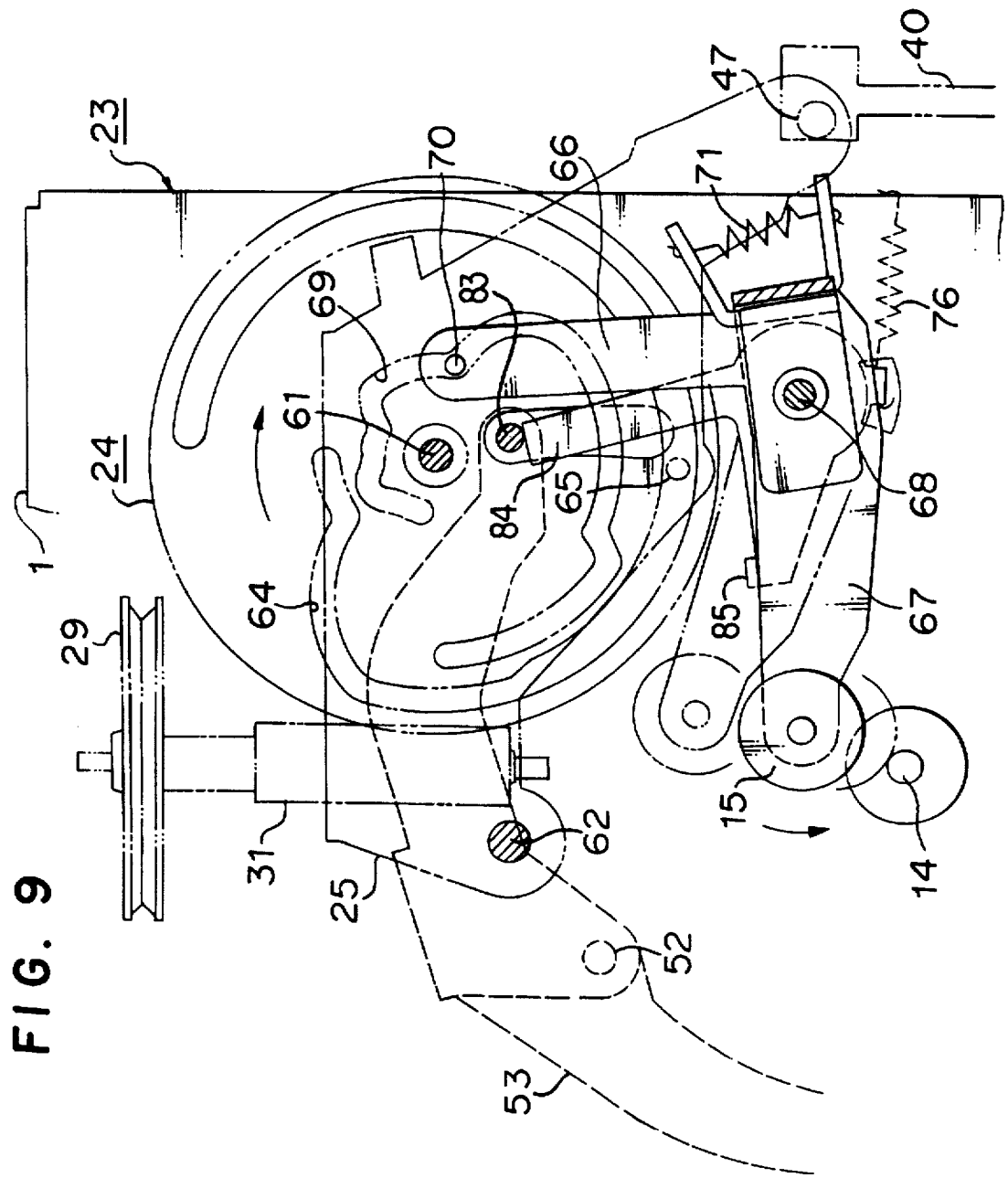
FIG. 9 is an enlarged plan view of the essential part of the other embodiment of this invention in a further modification of the first embodiment.

The device of this invention may include means for keeping the loading lever 53 in its tape loading position (as shown in FIG. 2), the loading lever 53 having a guide pin 83 guided along one of the guide routes mentioned above. The keeping means consists of a lever 84, pivoted to the common pivot shaft 68 and having a free end portion capable of being engaged to the guide pin 83 when the tape is pinched between the capstan roller 14 and the pinch roller 15, and a hook 85 adapted to push the supporting arm 67 by means of a tension spring member 86 biasing the loading lever 84 in a counterclockwise direction as shown in FIG. 9. Accordingly, the tape is slidably contacted to the periphery of the cylinder 2 by means of the loading pins 3 and 4 in a manner to be securely supported at the loading position thereof.

Figure 10:
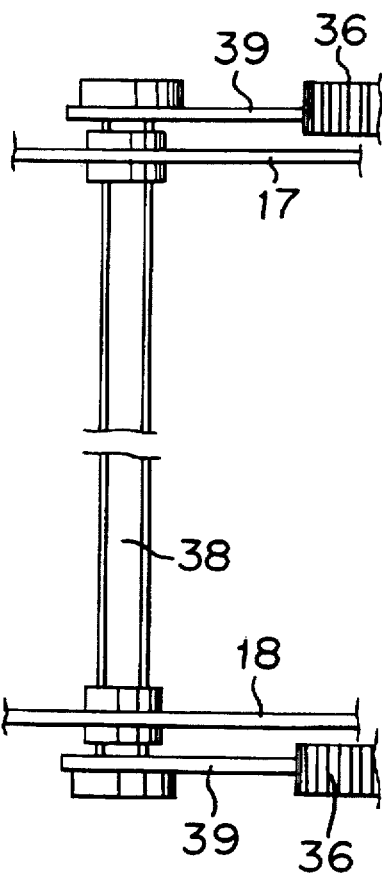
FIG. 10 is a diagrammatic plan view of the essential part of the further embodiment of this invention.
Figure 11:
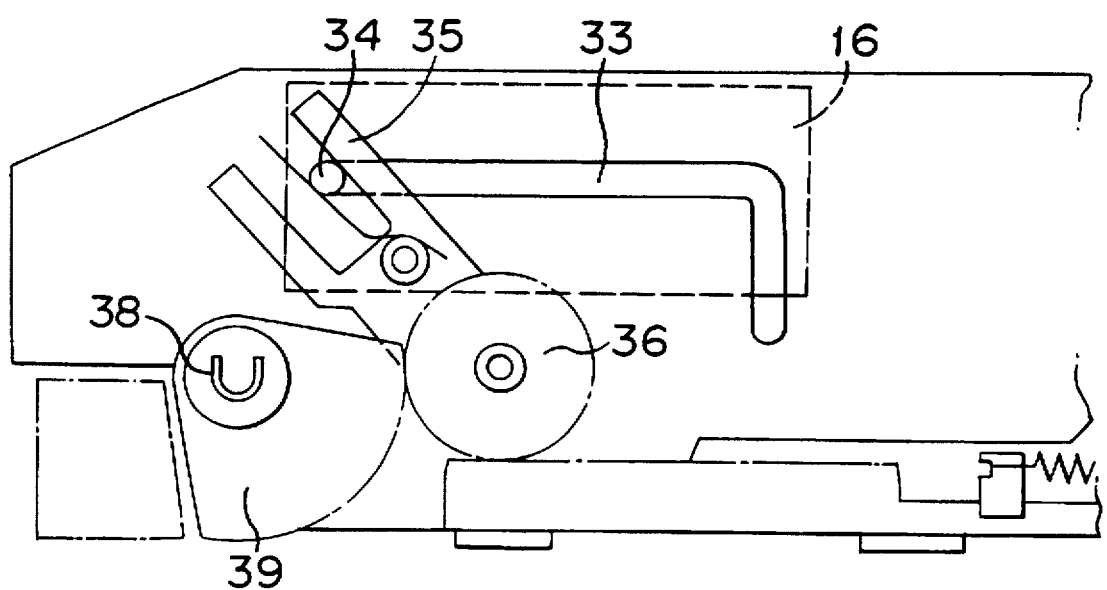
FIG. 11 is a side view of the part of the embodiment illustrated in FIG. 10.

In this embodiment, the shaft 38 may be made of a member having a U-shaped cross-section as shown in FIGS. 10 and 11 and the sector gears 39 each have a diameter larger than that of the gear 36 intermeshed therewith, whereby the twist motion of the shaft 38 is decreased when the tape cassette 9 together with the cassette holder 16 is carried from the inlet port to the tape deck, even if the shaft 38 is slender as compared to the prior shaft, because the shifting angle of the sector gear 39 is smaller than that of the prior device. Accordingly, the cassette holder 16 is smoothly carried along the guide slits 33 by means of the guide pins 34 and fork-shaped members 35.

Figure 12:
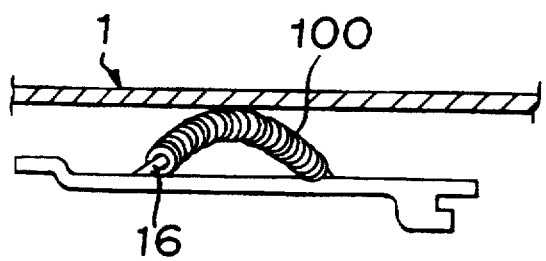
FIG. 12 is a vertical section of the part of a cassette holder illustrated in a front view of the embodiment of this invention mentioned above.

In this embodiment, the cassette holder 16 may be made of a plastic material. In this case, the cassette holder 16 should be provided with means for discharging electrostatic energy generated thereto. For example, the cassette holder 16 may include an earth or ground member 100 such as a coiled spring steel member (as shown in FIG. 12), or an elastic steel plate, etc., so as to leak the static electricity via sliding contact with the chassis.

What is claimed is:

1. A device for loading a tape cassette in and unloading a tape cassette from a tape recorder comprising:

a tape deck chassis;

tape reel supporting means for engaging tape reels of the tape cassette;

a cassette holder adapted to hold said tape cassette as it passes through an inlet port towards and away from said tape reel supporting means;

a cam disc, supported for rotation about a central rotation axis on said tape deck chassis, said cam disc including a guide route including a first section for transporting the tape cassette and a second section continuously extended from the first section for loading and unloading the tape cassette, said first section including a first portion and a second portion continuously extended from said first portion;

a swinging arm pivoted to the tape deck chassis;

a cam follow pin provided on said swinging arm and received in the guide route; and transporting means for transporting the tape cassette together with the cassette holder from the inlet port to the tape reel supporting means and vice versa to load the tape cassette in and unload the tape cassette from the tape recorder, the transporting means including a horizontally moving member connected to the swinging arm and reciprocally moved in a horizontal direction by the swinging arm, said horizontally moving member being provided with a rack gear, a pinion rotated by the rack gear, a guide arm rotated by the pinion and having a guide slot, a pin secured to the cassette holder and engaging the guide slot of the guide arm, and a substantially L-shaped guide slit which guides the pin in the horizontal direction and a vertical direction, the tape cassette with cassette holder both moving horizontally and vertically towards and away from the tape reel supporting means with a first speed when the cam follow pin is guided by said first portion of said guide route and a second speed when the cam follow pin is guided by said second portion of said guide route.

2. A device as defined by claim 1, and further comprising a spring provided on said guide arm and biasing said pin against one edge of said guide slot.

3. A device as defined by claim 1, wherein said horizontally moving member comprises a shift member interconnecting said guide arm and said cam disc and translating rotation of said cam disc into pivotal movement of said guide arm.

4. A device as defined by claim 3, and further comprising a sub-shift member, aligned with said shift member, moved by said guide arm before said cam disc is actuated for rotation about said central rotation axis.

5. A device as defined by claim 4, wherein said sub-shift member is resiliently connected to said shift member.

* * * * *